May 29, 1956  R. L. WALLACE, JR  2,748,235
MACHINE FOR AUTOMATIC FABRICATION OF TETRODE TRANSISTORS
Filed Feb. 4, 1955  8 Sheets-Sheet 1

INVENTOR
R. L. WALLACE, JR
BY Harry C. Hart
ATTORNEY

May 29, 1956      R. L. WALLACE, JR      2,748,235
MACHINE FOR AUTOMATIC FABRICATION OF TETRODE TRANSISTORS
Filed Feb. 4, 1955      8 Sheets-Sheet 2

INVENTOR
R. L. WALLACE, JR
BY Harry C. Hart
ATTORNEY

May 29, 1956  R. L. WALLACE, JR  2,748,235
MACHINE FOR AUTOMATIC FABRICATION OF TETRODE TRANSISTORS
Filed Feb. 4, 1955  8 Sheets-Sheet 3

INVENTOR
R.L. WALLACE, JR.
BY Harry C. Hart
ATTORNEY

May 29, 1956 R. L. WALLACE, JR 2,748,235
MACHINE FOR AUTOMATIC FABRICATION OF TETRODE TRANSISTORS
Filed Feb. 4, 1955

TABULATION OF CONNECTIONS

| TERMINAL | CONNECTED TO | ON PROG. STAGE |
|---|---|---|
| 1° | COUNTER RESISTORS | 5 |
| 2° | COUNTER RESISTORS | 15 |
| 3° | BASE 1 (EMITTER GROUNDED) | 22 |
| 4° | BASE 1 (COLLECTOR GROUNDED) | 23 |
| 5° | BASE 1 (BASE 2 GROUNDED) | 24 |
| 6° | VTVM 1 | 5 |
| 7° | VTVM 2 | 15 |
| 8° | VTVM 3 | 21 |
| 9° | VTVM 4 | 22 |
| 10° | VTVM 5 | 23 |

INVENTOR
R. L. WALLACE, JR.
BY Harry C. Hart
ATTORNEY

May 29, 1956  R. L. WALLACE, JR  2,748,235
MACHINE FOR AUTOMATIC FABRICATION OF TETRODE TRANSISTORS
Filed Feb. 4, 1955  8 Sheets-Sheet 8

FIG. 19

INVENTOR
R.L. WALLACE, JR.
BY
Harry C. Hart
ATTORNEY

United States Patent Office 2,748,235
Patented May 29, 1956

2,748,235

MACHINE FOR AUTOMATIC FABRICATION OF TETRODE TRANSISTORS

Robert L. Wallace, Jr., Plainfield, N. J., assignor to Bell Telephone Laboratories, Incorporated, New York, N. Y., a corporation of New York Application February 4, 1955, Serial No. 486,121

18 Claims. (Cl. 219—4)

This invention relates to the fabrication of minute circuit components and in particular to the fabrication of double junction transistors especially for high frequency use.

Such a junction transistor comprises a bar of a semiconductor material such as germanium of which the two end portions are of one conductivity type, for example N-type, while an intermediate zone, usually in the form of a thin layer extending transversely of the longest dimension of the bar is of opposite conductivity type, e. g., P-type.

By the very nature of the conduction which takes place within a transistor in the course of its operation, its high frequency cutoff depends on its size, and the higher the frequency at which it is to be employed, the more minute it must be. To reduce transit time effects, and so increase the high frequency cutoff, the width of the intermediate zone should be made very small indeed. Furthermore, the cross section of the semiconductor bar itself at the emitter zone should also be very small although not as small as the width of the zone. For a bar of given dimensions it is explained in Wallace Patent 2,695,930 that improvement in high frequency operation can be achieved by effectively constricting the area of the emitter zone still further, e. g., by the application of an electrical bias extending from side to side of the intermediate zone betwen electrodes bonded thereto. By employment of all of these techniques together it has been possible to achieve satisfactory operation of a junction transistor at frequencies of the order of 700 megacycles per second and higher. This, however, requires a semiconductor bar having in the approximate center thereof an intermediate zone of conductivity type opposite to that of the remainder of the bar whose thickness is of the order of 0.2 mil and whose cross section is of the order of 8 mils square. (Here and elsewhere in the present specification, the term "mil" designates $\frac{1}{1000}$ inch.) The determination of the location of this minute layer on the bar and the bonding of the base electrodes to opposite sides of it presents a problem to a human operator which taxes his ability to the utmost, even though he be provided with a microscope and a micromanipulator.

Accordingly, the principal object of the invention is to determine the exact location on a minute bar of semiconductor material which is principally of one conductivity type, of a still more minute intermediate zone of opposite conductivity type, and thereupon to bond one or more electrodes to this intermediate zone, and to perform these operations in a fashion which is sufficiently reliable and sufficiently rapid for production purposes.

The invention solves this fabrication problem by the provision of a machine which carries out the required operations of searching for the P-type layer and bonding base electrodes to opposite sides of it. The machine also measures the width of the P-type layer and proceeds with the bonding operation only when the width of the layer is found to lie between preassigned acceptance limits furnishing an indication on the basis of which specimens whose layers are too thick or too thin can be rejected. In the case of satisfactory specimens, the machine proceeds to weld each base electrode, which is itself a fine fragile wire, to a rugged pin provided for the purpose of external connection. Finally, it measures the electrical characteristics of the finished transistor. Furthermore, it performs all of these operations automatically under control of a program selector, proceeding to each new operation when the prior operation has been terminated.

Before the machine can carry out these operations it must be provided with a semiconductor bar in a definite orientation; i. e., the emitter zone must be at one end of the bar as seen by the machine, and the collector zone at the other. The two ends of the bar are visually indistinguishable from each other and can be distinguished only by electrical tests. Such tests advantageously constitute the first of the operations carried out by the machine. In making these tests the machine takes advantage of the photodiode characteristics of the semiconductor bar which differ as between the emitter junction and the collector junction. Accordingly, it makes the necessary electrical measurements while the bar is illuminated and, basing its action on the results of its tests, orients the bar in a fashion to permit the systematic performance of the remaining operations.

Among such remaining operations important ones are a search for the P-type layer, a determination of its exact location on the bar, and a measurement of its width. Here, again, the machine takes advantage of the photodiode characteristics of the collector junction.

The search itself is carried out through the agency of a probe of novel form; namely, a wire of a gold-gallium alloy whose body is about 1.6 mils in diameter and whose sensing tip has been squeezed in a vise into the form of a paddle. In the probing operation the long dimension of the paddle tip extends transversely of the semiconductor bar, engaging it firmly. It has been found that a probe of this configuration, constructed in this fashion, may be slid lengthwise of the bar with no damage either to the bar or to the probe. It may advantageously be advanced in small steps, a measurement being made during the dwell between each step and the next.

To obtain the highest certainty in a searching operation it is important that the probe make firm electrical contact with the germanium bar. It has been established by test that such firm contact is ensured by the momentary passage of a current pulse, through the probe to the bar. Thereafter, a reverse direction bias, such as to hold the transistor in its cutoff state, is applied to the probe while electrical measurements are being made.

As a convenience to an operator such electrical measurements may be monitored by displaying, for example on the screen of a cathode ray oscilloscope, the measured characteristic. As a refinement the characteristic of the illuminated bar may be thus displayed in alternation with the characteristic of the unilluminated bar by arranging that the illumination shall be intermittent.

Hence, the machine flashes a light on the bar once for each step of the advance of the probe, turning it on at the beginning of the measurement and off before the completion of the measurement and during the advance of the probe.

The invention will be fully apprehended from the following detailed description of a preferred embodiment thereof taken in connection with the appended drawings in which:

Figs. 3 and 4 are a side view and a front view, respectively, of a four-pin header with a semiconductor bar mounted between the second pin and the third. Fig. 4 also shows base electrodes bonded to the intermediate zone of the bar;

Figures 1, 2:
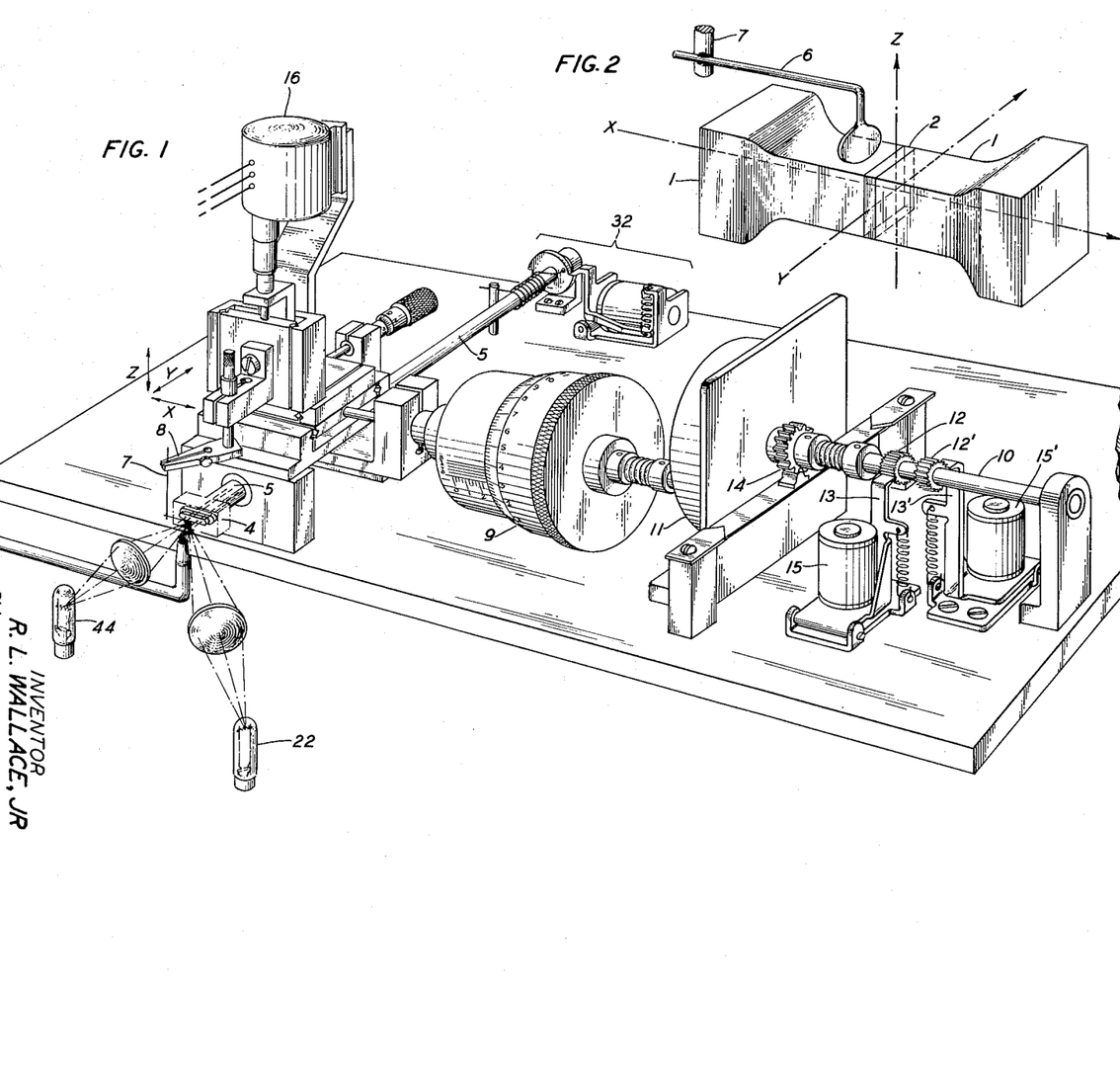
Fig. 1 is a view in perspective of a machine constructed in accordance with the invention.
Fig. 2 is a perspective view, greatly enlarged, of a bar of semiconductor material having an intermediate zone whose conductivity type is opposite to that of the body of the bar, and a search probe of novel configuration.

The fabricating machine which will be described in detail below is shown in perspective in Fig. 1. The machine is supplied with two main components on and with which it operates. The first such component, shown to an enlarged scale in Fig. 2 is a minute bar 1 of semiconductor material, for example N-type germanium having a thin slab or layer 2 of P-type material in its approximate center and extending transversely of the long dimension of the bar. The P-type layer is bounded on one side by an emitter junction and on the other side by a collector junction. These two junctions are of different electric and photo-responsive characteristics. Such a bar may be cut from a much larger single crystal of germanium which has been fabricated by the so-called "rate-drawing" process which forms the subject-matter of an application of E. Buehler and G. K. Teal, Serial No. 234,408 filed June 29, 1951.

Especially for high frequency operation it is of advantage that the cross section of the P-type layer and of the two junctions which bound it shall be very small, e. g., of the order of 8 mils square. A bar whose lateral dimensions are several times as great may readily be necked down over the central portion of its length which contains the P-type layer by etching it in an acid, the ends of the bar being protected from the acid etch by an appropriate material such as wax or a plastic. Fig. 2 also shows three mutually perpendicular axes labeled X, Y and Z for reasons which will be apparent below.

Figure 3:
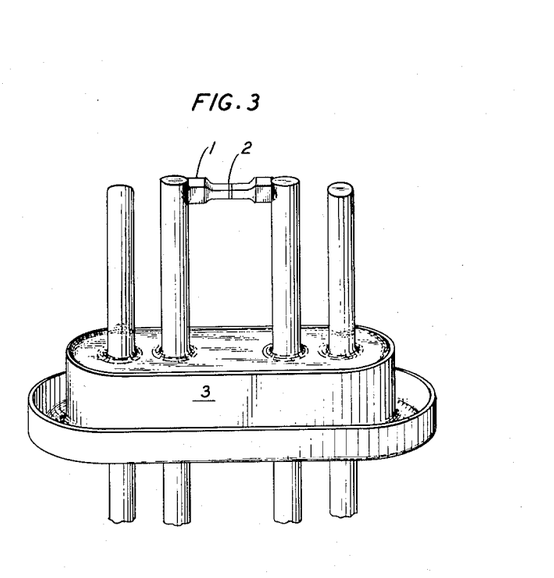
Figure 4:
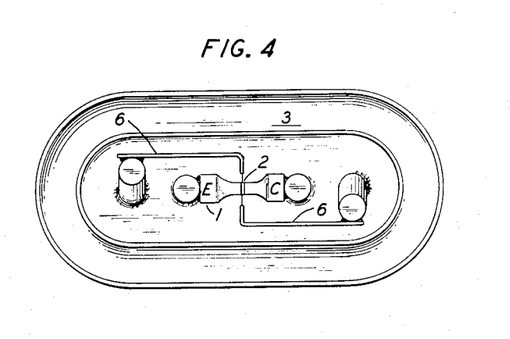

The bar 1 may be supported in positive fashion in a header 3 illustrated in Figs. 3 and 4 which comprises four pins which are mounted in an insulating base of glass or the like and surrounded by a metal shell. It may advantageously be soldered between the two center pins of the header as shown in Figs. 3 and 4. The header, carrying its germanium bar, may now be inserted in a jig 4 which forms a part of the machine as shown in Fig. 1. This jig 4 is in turn mounted on the end of a shaft 5 which is arranged to rotate about the Y axis (Fig. 2) in a fashion to be described below. A nozzle is mounted below the jig to supply a dry gas such as nitrogen to the bar 1 throughout the operations of the machine. This serves to prevent the condensation of water vapor on the bar which would interfere with its transistor operation, on which the machine relies.

The second component with which the machine is supplied is a fine wire 6 of a tough ductile conductive metal. An alloy of gold containing about two per cent of gallium has been found to serve well. This wire, whose diameter is of the order of 1.6 mil, is supported as by welding to a much thicker metal rod 7, for example a nickel wire of about 10 mils diameter. The unsupported end of the wire is bent through a right angle for a length of about 15 mils, and the tip of the bent portion is formed into the shape of a paddle, as by squeezing it in a vise. Fig. 2 shows the gold wire 6 with its paddle tip juxtaposed with the germanium bar 1 in the position which it occupies at the commencement of the probing operations by the machine. It is to be noted that the long dimension of the paddle tip extends transversely of the long dimension of the germanium bar 1 and hence parallel with the long dimension of the P-type layer 2.

The nickel wire 7 to which the gold wire probe 6 is welded is supported in a clamp 8 which is mounted for precise controlled movement in the X direction and in the Z direction. Guides for these movements may be of the type employed in the construction of micromanipulators. Movement in the X direction is controlled by a fine lead screw, concealed in Fig. 1 within a calibrated drum 9 and which is rotated in like small angular steps. Such rotation may be accomplished in any desired fashion, for example by the provision of a second shaft 10, coupled to the lead screw through a gear reduction box 11 and provided with a toothed ring or gear 12 which is advanced in stepwise fashion by a pawl 13 and, after each such advance, held positively in position by a spring-loaded detent 14. The pawl 13 may be moved by a solenoid 15, actuated by a current pulse derived in a fashion to be described. A similar pawl 13', and toothed ring 12' are provided, for actuation by a similar solenoid 15', to advance the clamp 8 in the opposite direction along the X axis.

With this structure it has been found possible to advance the paddle tip of the gold wire probe along the surface of the germanium bar in like steps, each of which is only 50 microinches in length.

The vertical or Z axis drive of the wire-supporting clamp is similarly actuated through a concealed lead screw which, however, is rotated continuously rather than in steps by a motor 16. The details of the circuits for starting and stopping the motor at appropriate times will be described below.

The only movement to which the bar itself is subjected is a rotation through 180 degrees about the Y axis by an abrupt rotation of the shaft 5 on which the header 3 is mounted. This movement is controlled by apparatus to be described.

The heart of the machine is an automatic program selector 20 comprising nine banks of contacts, each carrying a number of terminals, a wiper bar for each such bank, all the wiper arms being mounted on a common shaft, and appropriate mechanism for advancing the arms together through one step at a time in response to control pulses. Such a program selector is show schematically in Fig. 5. The advance may be accomplished through a ratchet and pawl arrangement, the pawl being actuated by a solenoid 21.

Figures 5, 17:
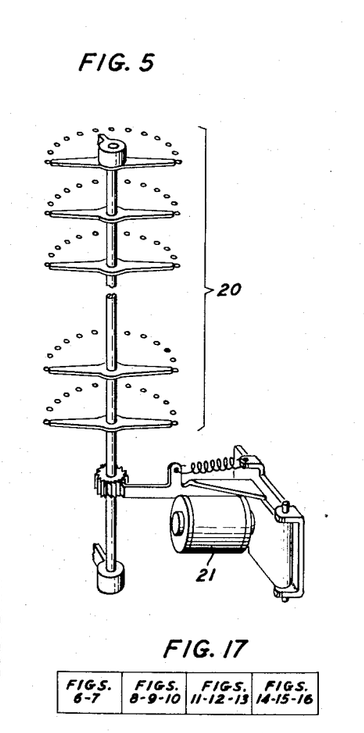
Fig. 5 is a perspective view of a pulse-operated program selector.
Fig. 17 is a key showing the normal arrangement of Figs. 6–16.

The several wipers of the program selector 20 shown as moving arms in Fig. 5, and symbolized as arrowheads in Figs. 6–16, are permanently connected to the principal elements involved in the various operations carried out by the machine as follows:

Wiper No. 1 to right step coil
Wiper No. 2 to left step coil
Wiper No. 3 to program advance pulser
Wiper No. 4 to counter reset
Wiper No. 5 to goldwire clamp
Wiper No. 6 to ground
Wiper No. 7 to B+ voltage supply
Wiper No. 8 to collector header pin
Wiper No. 9 to emitter header pin The circuit details of the program selector 20 and of associated apparatus components will now be described in connection with the description of the step-by-step operation of the apparatus as a whole. Such circuit details are shown for several stages of the program in Figs. 6–16. In each of these figures the uppermost contact is that of the first bank of the program selector 20, the next lower contact is that of the second bank, etc. Thus, as the selector advances from each stage to the next by advance of the wiper arms of Fig. 6 around their terminal banks, the resulting connections are schematically shown in that one of Figs. 6–16 having the next higher number.

Figure 6:
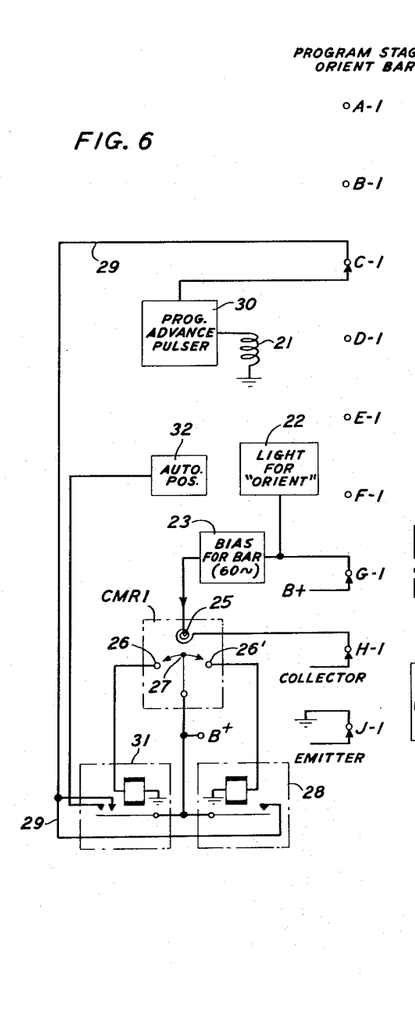
Figs. 6 through 16 are schematic circuit diagrams showing the internal connections made by the program selector for each of eleven successive positions.

Stage 1.—Orient bar (Fig. 6)

For satisfactory operation of the machine the orientation of the germanium bar 1 in its header 3 must be definite and the same for all specimens. The orientation of the bar in the header is at first ambiguous or uncertain in that the emitter junction may be at the left-hand end and the collector junction at the right-hand end or vice versa. The "proper" orientation is arbitrarily selected as that in which the emitter junction is on the left. Accordingly, the first operations of the machine are to check the orientation of the bar 1 and, if it is wrong, to turn the bar end for end. This operation is carried out as follows:

The bar is steadily illuminated by a lamp 22 while once the machine has been placed in operation by advancing the selector 20 to stage 1, an alternating potential of about 6 volts derived from a source 23 is applied, through contacts H–1 and J–1 of Fig. 6, to the two center pins of the header 3, thus causing a corresponding alternating current to flow from end to end of the bar 1. The emitter junction and the collector junction act in opposition as rectifiers of this current. As a result of the rate-drawing process of the aforementioned Buehler-Teal application, the rectification characteristics of these two junctions, especially when illuminated, are unlike. Hence a non-zero average current also flows through the bar, and it flows to the left or to the right in dependence on the orientation of the bar. This current flows through the coil 25 of a direct-current meter $CMR_1$, which accordingly indicates the polarity of this average current, and therefore the orientation of the bar.

With the direct-current meter there is associated a relay having two manually adjustable contacts 26, 26' and a moving contact 27 which is positioned by the current flowing in the meter coil 25. Such devices are well known as contact meter relays, hereinafter abbreviated "CMR."

In the event that this average current is positive (i. e., correct orientation of the bar 1 is indicated) the moving arm 27 is deflected to the right, engages the fixed contact 26' and permits the current of a steady source, indicated as B+, to flow through the coil of a relay 28 and to ground. Current in this coil closes the contact of this relay 28. This establishes a connection from B+ through a conductor 29 and contact C–1 of the program selector 20 to a program advance pulser 30 which delivers a pulse of current through the program advance coil 21 and thus advances the program to the next stage. If, on the other hand, the orientation of the bar 1 in the header 3 is incorrect the average value of the current in the coil 25 of $CMR_1$ is negative and causes the movable arm 27 to engage the lefthand fixed contact 26, thus connecting the B+ source through the coil of another relay 31 to ground. Flow of current through this coil 31 closes its two relay contacts. Closure of the first of these operates the program advance pulser 30 as before. At the same time, however, closure of the second contact actuates the autopositioning apparatus 32 which responds by turning the header 3, carrying its germanium bar 1, end for end as described above.

At the conclusion of this operation there is certainty that the germanium bar 1 is correctly oriented and that further operations will have their intended effect. Furthermore, the program selector 20 has been advanced to its second stage.

The autopositioning apparatus 32 itself may be of any desired variety, many of which are readily available. A particularly simple one, indicated in Fig. 1, comprises merely a shaft carrying a cam having two lugs projecting from its periphery at opposite ends of a diameter, one of which is urged by a spiral spring against a spring-loaded pawl. The pawl may be mechanically connected to the plunger of a solenoid. Application of a current pulse to the solenoid winding draws the pawl out of engagement with the lug, whereupon the spiral spring rotates the shaft until such rotation is terminated by engagement of the oppositely located lug with the pawl.

Figure 7:
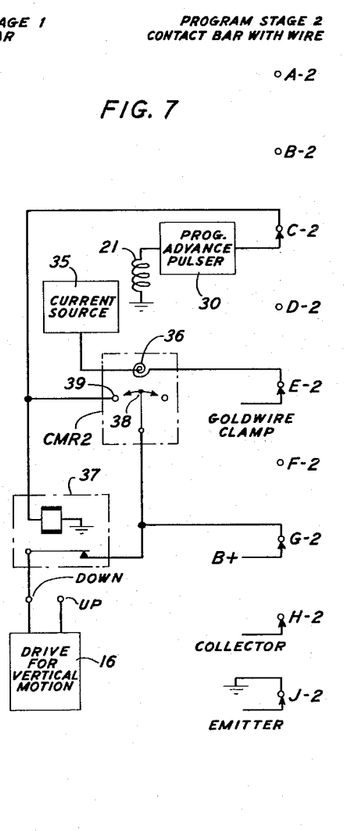

Stage 2.—Engage probe with bar (Fig. 7)

At this stage a direct-current source 35 of about 10 microamperes is connected through contacts E–2 to the clamp 8 for the gold wire 6 through the coil 36 of $CMR_2$. At the same time the B+ source is connected through contacts G–2 and through normally closed contacts of a relay 37 to the "down" terminal of the vertical drive motor 16 for motion along the Z axis. The motor 16 then rotates and moves the gold wire 6 down toward the germanium bar 1. When the gold wire makes electrical contact with the bar, a current flows through the coil 36 of $CMR_2$. This current closes the contacts 38, 39 of $CMR_2$ and puts B+ voltage on the coil of relay 37. The contacts of this relay then open, removing the power supply from the motor 16 and so arresting the vertical motion of the gold wire 6. At the same time the B+ source is connected through program selector contact C–2 to the program advance pulser 30 which applies a current pulse to the program advance coil 21 and advances the program selector 20 to the next stage.

With appropriate choice of the dynamic characteristics of the vertical drive motor 16 and the damping of its gear train, removal of the actuating voltage permits the motor to coast for a distance corresponding to a further advance of the gold wire of about 1 mil, thus to ensure not only electrical contact but firm engagement between the tip of the wire and the germanium bar.

Figure 8:
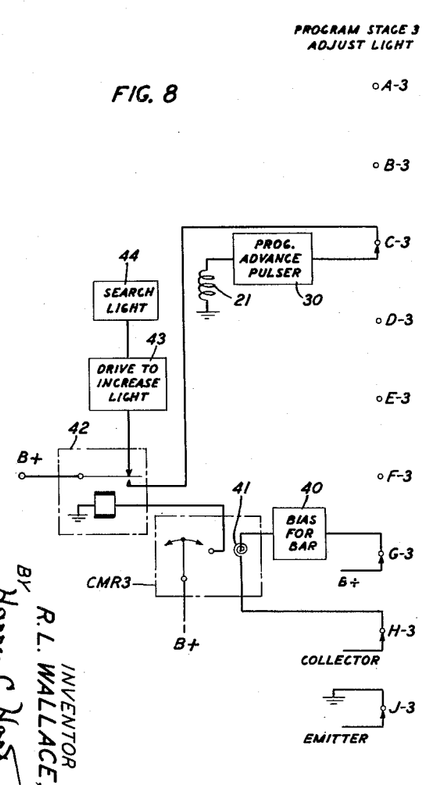

Stage 3.—Adjust illumination (Fig. 8)

For reasons to appear later, it is advantageous to illuminate the bar with light of such intensity that when the collector junction is reversely biased and the emitter junction forwardly biased, about 1 milliampere of current flows through the bar 1. A steady bias of appropriate polarity from a source 40 is connected through the coil 41 of $CMR_3$ to the collector end of the bar through contacts H–3. The emitter end of the bar is connected to ground through contacts J–3. The source B+ is connected through normally closed contacts of a relay 42 to a device 43 which steadily increases the intensity of a second lamp 44. This device 43 may be a motor-driven variable resistor connected in series with the power supply for the lamp 44. When the current through the coil 41 of the $CMR_3$ rises to 1 milliampere, a CMR contact is closed which applies B+ voltage through the coil of the relay 42 to ground. When the relay 42 operates, the device 43 increasing the intensity of the light 44 ceases to operate, thus leaving the intensity of the lamp fixed. By manual adjustment of the contacts of $CMR_3$ its contacts are closed when, and only when, the collector current which flows under the influence of the light 44 has reached the magnitude of 1 milliampere.

When the relay 42 operates to stop increasing the intensity of the light it simultaneously applies B+ voltage through contacts C–3 to the program advance pulser 30 which sends a current pulse to the coil 21 of the program selector 20 and advances the program selector to the next stage.

Figure 9:
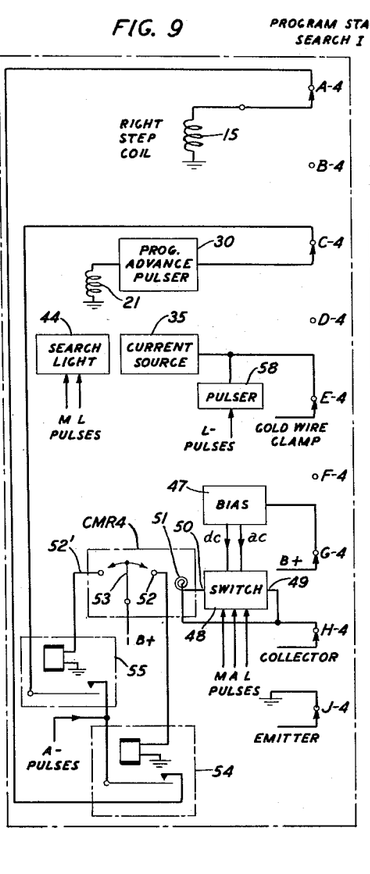

Stage 4.—Search I (Fig. 9)

The search stage of the program is based on the following principle. When a steady light is directed at the collector junction of the bar 1 under steady reverse bias a certain direct current (adjusted in stage No. 3) flows. The gold wire 6, acting as a probe, carries a small reverse current e. g., about 10 microamperes. If the gold wire is in contact with either the emitter or the collector, essentially no effect is produced on the collector current. If, however, the wire is in contact with the P-layer, the bar can operate as a transistor. Now the bias applied to the probe 6 is of a magnitude and sign such as to bias the transistor to cut off. In other words, transistor action causes the current entering the intermediate layer through the gold wire to neutralize the effect of light on the collector current. Hence the collector current is drastically reduced, say to 1 microampere or less. This effect is used to determine the location of the gold wire on the bar.

Figure 18:
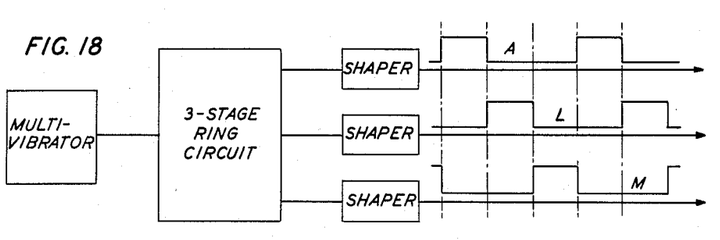
Fig. 18 is a schematic circuit diagram showing a generator of pulses which actuate various of the apparatus components.

For the operations of this stage of the program, special pulses are required whose wave forms are shown in Fig. 18 i. e., a full period of the sequence comprises first an A-pulse which occupies one-third of the period, next an L-pulse which occupes a second third, and last an M-pulse which occupies the last third of the period. Each succeeding period is like the first.

Any convenient pulse generator having three output terminals on which A, L, and M-pulses appear in succession serves the purpose, for example, as shown in Fig. 18, a basic timing source such as a multivibrator which in turn actuates a three-stage stepping ring from each stage of which an output is drawn through a pulse-shaper.

A voltage bias from a source 47 is connected through a switch 48 through contacts H–4 to the collector. The emitter is connected through contacts J–4 to ground. The switch 48 receives A, L, and M-pulses and establishes the following conversions:

A-pulse input, 60 cycle output
L-pulse input, 60 cycle output
M-pulse input, direct-current output The switch 48, which may have any desired construction, carries out the following operations:

During A-pulses and L-pulses, alternating current flows directly from an output point 49 to the collector. This merely provides the possibility of displaying the current-voltage characteristic of the bar 1 on the screen of an oscilloscope. During M-pulses direct current flows from another output point 50, through the coil 51 of $CMR_4$ to the collector. $CMR_4$ is adjusted by means of movable contacts so that if the current through its coil 51 is greater than ½ milliampere CMR contacts 52, 53 are closed, to send B+ voltage through the coil of a relay 54 to ground. If this relay 54 is actuated, A-pulses are sent through contacts A–4 to the right step coil 15. If, on the other hand, the current through the coil 51 of $CMR_4$ is less than ½ milliampere, CMR contacts 52', 53 are closed, which applies B+ voltage through the coil of a relay 55 to ground. The A-pulse following operation of this relay is sent through contacts C–4 to the program advance pulser 30 which advances the program selector 20 to the next stage. Thus the machine moves the wire 6 stepwise to the right until the emitter junction is located.

$CMR_4$ is arranged so that the current indication which it attains during each M-pulse is held throughout the following A- and L-pulses.

During this stage the current source 35 mentioned in stage 2 is connected through contacts E–4 to the gold wire 6. The light 44 illuminating the bar is turned on during L- and M-pulses and off during A-pulses, to afford the possibility of displaying, as on an oscilloscope, the light and dark V–1 characteristics of the bar. For and during each L-pulse, a pulser 58 is actuated. When actuated, it delivers to the gold wire 6 a brief pulse of current, of the order of 30 microamperes, and of opposite sign to that of the normal measuring current carried by the probe 6 under the influence of the source 35.

*Stage 5.—Measure width of P-layer (Fig. 10)*

Figure 10:
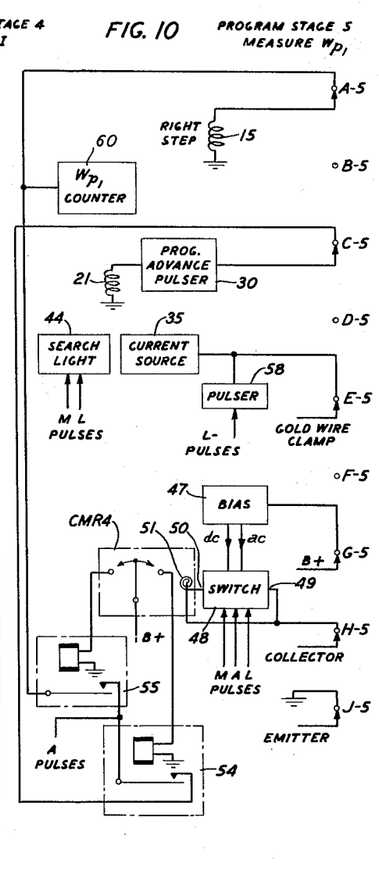
Figure 19:
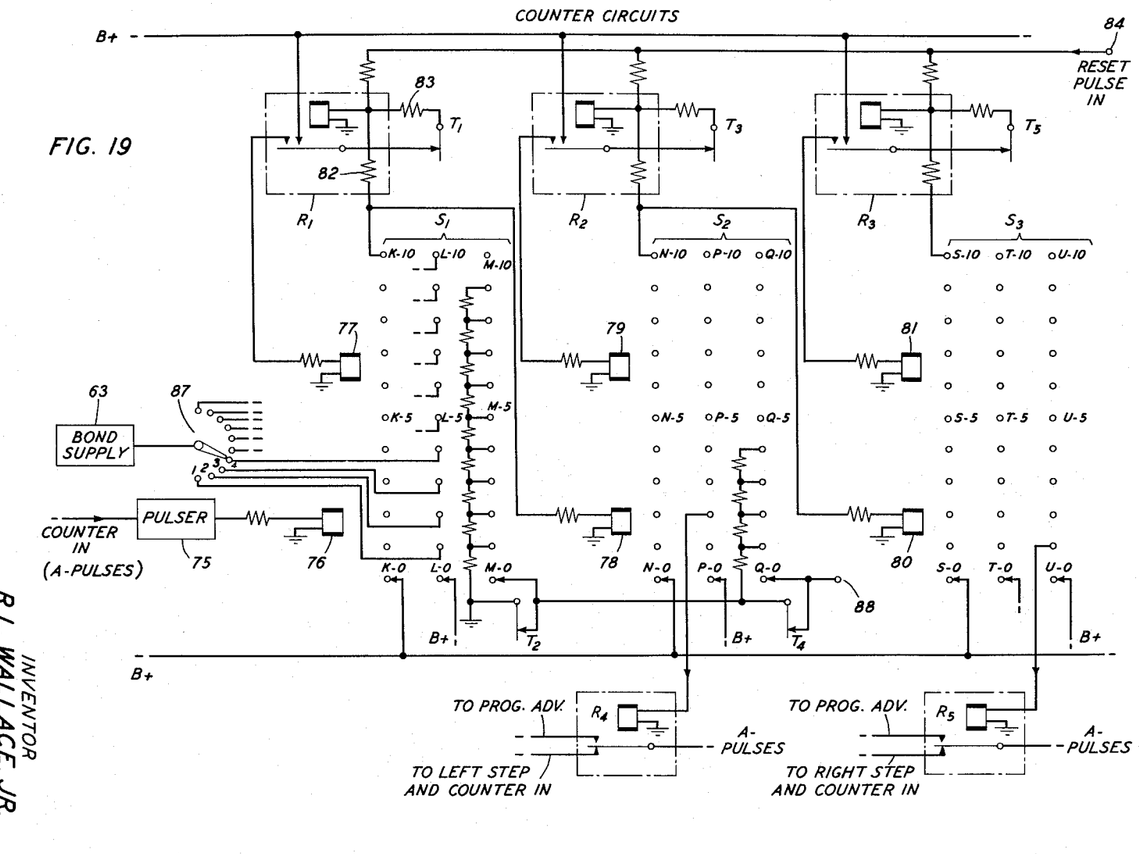
Fig. 19 is a schematic circuit diagram showing a pulse counter which assists the remainder of the machine in making the various measurements required.

At this stage the same biases are applied, from the source 47 through the same switch 48 and through the coil 51 of the same $CMR_4$, to the collector through contacts H–5. The emitter is connected through contacts J–5 to ground, and the probe 6 is connected through contacts E–5 to the current source 35 and the pulse source 58. Furthermore the light 44 is turned on and off as in stage 4. At this stage, if $CMR_4$ draws a current of less than ½ milliampere, indicating contact of the gold wire 6 with the P-layer, the contacts of relay 55 are closed, sending A-pulses through contacts A–5 to the right step coil 15. Each of these pulses is also sent to a counting circuit 60 which registers and holds the number of such steps taken, and so provides a measurement of the width of the P-layer. The details of the counter 60 are shown in Fig. 19 and will be described below. If, on the other hand, the current through $CMR_4$ is greater than ½ milliampere, indicating that the probe 6 has reached and passed the collector junction, the contacts of relay 54 are closed so that the next A-pulse is sent through contacts C–5 to the program advance pulser 30, thus advancing the program selector 20 to the next stage.

*Stage 6.—Return to emitter end of bar (Fig. 11)*

Figure 11:
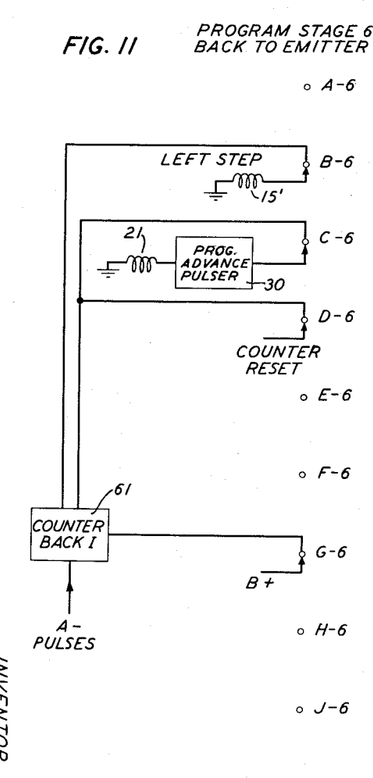

At this stage A-pulses are sent to a counter 61, of which the details are again as shown in Fig. 19. Its internal connections, which will be described below, enable it to carry out the following operations:

A number of A-pulses are sent through contacts B–6 to the left step coil 15, the number of these pulses being preset and sufficient to ensure that the gold wire 6 is returned past the emitter junction; i. e., a number in excess of the number counted in crossing the P-layer. The A-pulse following this counted number of pulses is sent instead through contacts C–6 and D–6 to the program advance pulser 30, and to the reset terminal of the counter, thus advancing the program selector 20 to the next stage and clearing the counter 61.

*Stage 7.—Search II (Fig. 12)*

Figures 12, 13:
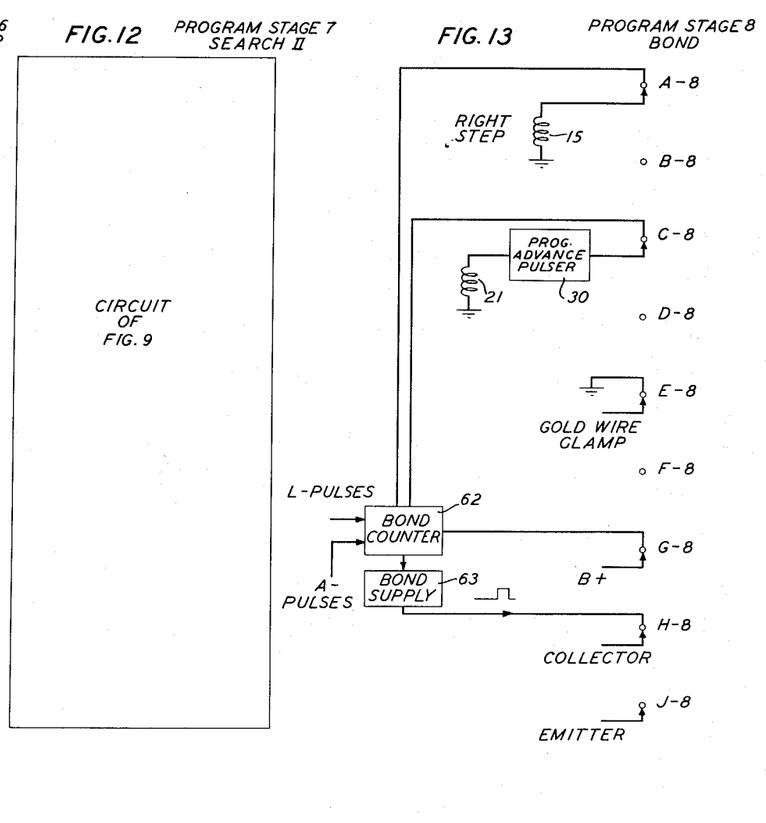

Operations performed during this stage are precisely the same as those performed during Search I, and accordingly the connections of the program selector 20 are as shown in Fig. 9. Thus, when the program selector is advanced to the next stage the gold wire 6 is located again at the emitter junction.

*Stage 8.—Bond (Fig. 13)*

For best performance of a junction transistor the base electrode should be firmly bonded to the P-type layer and close to the emitter junction but not overlapping it. There may, however, be a substantial overlap between the bond and the collector junction, thus deforming the latter.

The minimum thickness which the tip of the bonding wire may have without becoming so fragile as to risk breakage in the searching operation is 0.3–0.4 mil. Thus, this tip, thin though it is, is still considerably thicker than the P-type layer of the most minute transistor. In such case it has been found by experience that the surest way to secure a bond in the optimum location is to advance the center of the tip of the probe past the emitter junction by a definite number of steps, e. g. six steps, which number may be somewhat greater than the number of steps registered in the measurement of the width of the P-type layer. The bonding operation then takes place in a fashion to overlap the collector junction. Due to the gallium content of the gold wire the bonding operation forms a small volume of P-type material under and around the bond. This small volume must intersect the P-layer of the bar and thus effectively extends the upper surface of the P-layer toward the collector end of the bar. After the bond has been completed, the distance separating the emitter junction from the nearest face of the bonded base electrode is substantially less than the width of the P-type layer; i. e., it makes positive contact with the P-type layer, and at a point thereof which is exceedingly close to the emitter junction.

Accordingly, during this stage of the program the bond counter operates as follows:

A preset number of A-pulses, e. g. six, are routed to a bond counter 62, and through contacts A–8 to the right step coil 15. The L-pulse following the last of these A-pulses triggers a bonding supply source 63. This source then sends a pulse of current through contacts H–8 to the collector and then through the gold wire 6 and contacts E–8 to ground. This bonding pulse is of sufficient magnitude and duration to form a satisfactory mechanical and electrical connection between the gold wire 6 and the bar 1. The A-pulse following immediately after the above L-pulse is sent through contacts C–8 to the program advance pulser 30 which advances the program selector 20 to the next stage.

The gold wire 6 has now exchanged its role of probe for the new role of base electrode. Because of its fragility, it is desirable to weld it to a much more rugged element, to serve as an external base terminal of the transistor. The machine performs this operation as follows:

*Stage 9.—Ready to weld (Fig. 14)*

Figures 14, 15, 16:
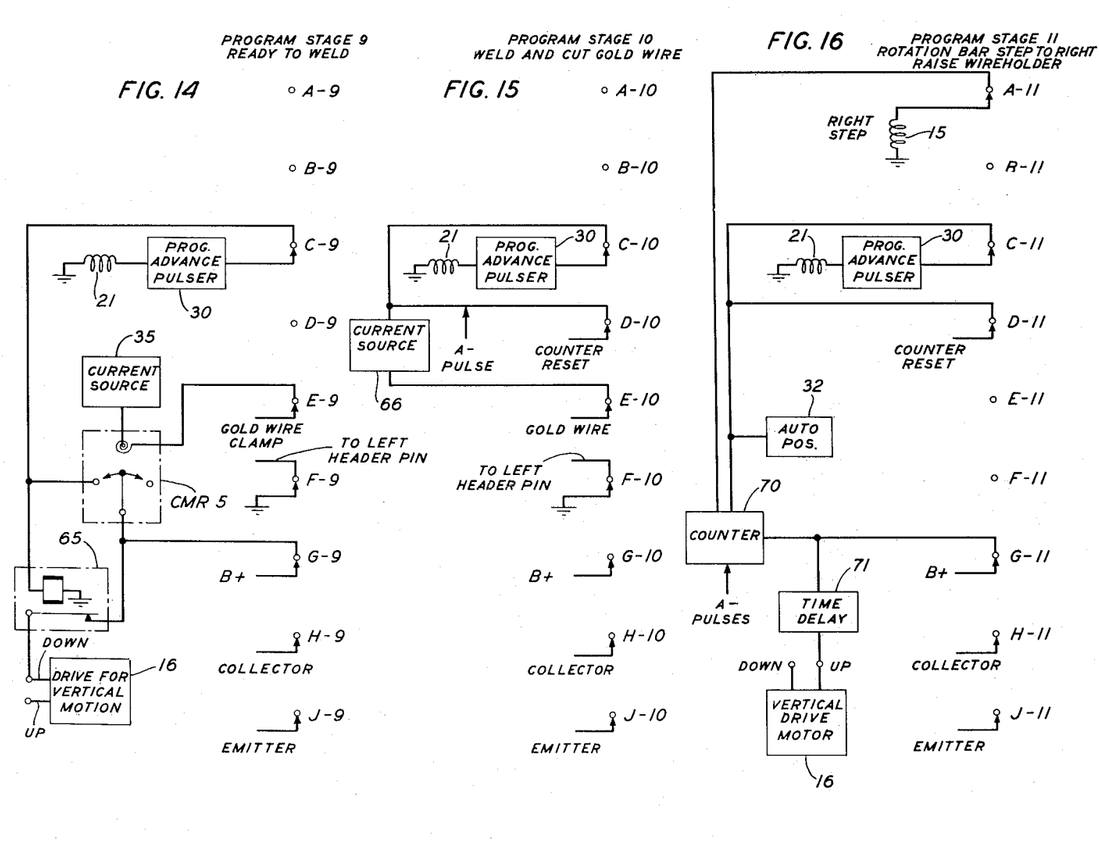

At this stage the emitter and the collector are disconnected from external circuits by opening program selector contacts H–9 and J–9, and the current source 35, mentioned in stage 2, is connected by way of contact E–9 through the coil of CMR₅ to the gold wire 6. B+ voltage is sent through normally closed contacts of a relay 65 to the "down" terminal of the vertical drive motor 16 which thus moves the free end of the gold wire 6 downward. When the gold wire, in moving downward, makes electrical contact with the left-hand free pin of the header 3, current flows in the coil of CMR₅, and B+ voltage is applied, through the closing of the contacts of CMR₅ to the coil of a relay 65 and through contacts C–9, to the program advance pulser 30. The operation of the relay 65 arrests the vertical movement of the gold wire. The B+ voltage on the program advance pulser 30 advances the program selector 20 to the next stage.

*Stage 10.—Weld and cut gold wire (Fig. 15)*

During this stage the left header pin is connected through contacts F–10 to ground. The first A-pulse to occur actuates a high current source 66 which sends its current by way of contacts E–10 and F–10 through the free end of the gold wire and the header pin to ground. This current is sufficient to weld the gold wire to the header pin and to melt the tag end of the gold wire which reaches from the header pin to the supporting nickel wire 7. The same A-pulse is sent through contacts C–10 to the program advance pulser 30 and through contacts D–10 to the reset terminal of the counter. Thus, the program selector 20 is advanced to the next stage and the counter is cleared.

The fabrication of a transistor triode is now complete. For a tetrode, further operations are required, as follows:

*Stage 11.—Rotate bar, step to right (Fig. 16)*

At this stage, A-pulses are sent to a counter 70, of which the details are shown in Fig. 19, whose internal connections enable it to carry out the following operations:

One hundred A-pulses are sent through contacts A–11 to the right step coil 15. The 101st A-pulse is sent instead to three destinations:

1. The autopositioner 32. This unit then rotates the header 3, carrying the bar 1, through 180 degrees about the Y axis.
2. Through contacts D–11 to the reset terminal of the counter 70, thus clearing it.
3. Through contacts C–11 to the program advance pulser 30, thus advancing the program selector 20 to the next stage.

Simultaneously with the commencement of the 100 step count, B+ voltage is applied through contacts G–11 and through a time delay or "slow release" switch 71 to the "up" terminal of the vertical drive motor 16. The motor immediately starts to rotate in a direction to move the probe clamp 8 upward. It ceases its rotation after an interval determined by the delay, and before the completion of the 100 A-pulse count. As a result, the clamp 8 has been moved to a position such that it is clear of the header 3 when the latter is turned end for end by the autopositioner 32.

Thus, at the end of this stage the emitter end of the bar is on the right and the base wire clamp 8 is in a position such that when a new probe wire support 7 is inserted in the clamp, the tip of the probe wire 6 lies above the emitter end of the bar 1 and in position to engage it.

*Stages 12–20.—Repetition of foregoing operations for auxiliary base electrode*

After the manual insertion of a new paddle-tipped gold wire 6 all the operations of stages 2–10, inclusive, are repeated, with the sole change that searching proceeds from right to left. This change of direction is simply accomplished by interchange of the connections as between the right and left step coils. It is evidently unnecessary to repeat stages 1 and 11, orientation and rotation of the bar.

The fabrication of the transistor tetrode is now complete, and it has the form shown in Fig. 4. It remains to apply appropriate quality control tests to the transistor in order to determine whether the bonds and welds have been satisfactorily made and made without injury to the germanium bar.

Appropriate parameters of the transistor to measure are: emitter breakdown voltage, collector breakdown voltage and base-to-base resistance. Now that the transistor is provided with four terminals it will readily be appreciated that by the addition of three more simple stages, which may be designated stages 21, 22, and 23, respectively, interconnecting appropriate power sources and meters with selected electrodes, each of these measurements can be made with ease. The results of such measurements may be indicated in conventional fashion on meter dials and they may operate registering devices or otherwise to suit the convenience of a manufacturing program.

Each of the operations carried out by the machine can also be carried out by hand, though with much less speed and with somewhat less certainty. Reference is made to a copending application of E. Dickten, R. P. Riesz and R. L. Wallace, Jr., Serial No. 486,073, filed February 4, 1955, for a fuller discussion of certain of these method steps.

*Counter circuits*

In several of the foregoing program stages, reference was made to a counter. In stage 5, the counter 60 serves to measure the width of the P-layer. In stage 6, the counter 61 controls the return of the gold wire to the emitter end of the bar, counting a number of steps in excess of the number counted in stage 5. In stages 8 and 11 the counters 62 and 70 serve to advance the gold wire 6 by a preassigned number of steps to the right.

A counter which serves all of these purposes is shown in Fig. 19. The main components of this counter are three rotary stepping switches $S_1$, $S_2$, $S_3$ and auxiliary relays $R_1$, $R_2$, $R_3$, $R_4$, $R_5$. Associated with the stepping switches are auxiliary switches $T_1$, $T_2$, $T_3$, $T_4$, $T_5$. Input A-pulses are sent to a pulse forming unit 75 which produces pulses of appropriate type to operate a stepping coil 76 of switch $S_1$. For each position of the movable contacts of the switch $S_1$, each pulse through stepping coil 76 advances its contacts to the next higher position. Associated with the switch $S_1$ is a reset coil 77. When this coil is actuated the contacts of $S_1$ are driven back toward the zero position by a return spring. Switches $S_2$ and $S_3$ operate in identical fashion through their associated stepping and reset coils 78, 79, 80, 81.

Decimal counting

With all the stepping switches set at their zero positions, a train of A-pulses is applied to the counter. The first nine of these advance $S_1$ to its ninth position. When the tenth pulse advances $S_1$ to its tenth position, B+ voltage is applied through contacts K–10 to the stepping coil 78 of $S_2$, thus advancing $S_2$ to its first position. At the same time B+ voltage is applied through an appropriate dropping resistor 82 to the coil of the relay $R_1$. Closing of the contacts of $R_1$ applies B+ voltage to the reset coil 77 of $S_1$, thus starting its contacts traveling toward their zero positions, and at the same time through switch $T_1$ and an appropriate dropping resistor 83 to the coil of $R_1$. This acts to hold $R_1$ in its operated condition after the wiper of $S_1$ has fallen away from its tenth position. Switch $T_1$ remains closed unless the contacts of $S_1$ are on zero, whereupon it opens. A simple mechanical link from the contacts of $S_1$ to $T_1$ enables it so to operate. Thus, the reset coil of $S_1$ receives B+ only until its wipers have returned to zero. The counter now registers "10" since the wipers of $S_2$ are on their first step.

This entire process is repeated until the wipers of $S_2$ reach the 10th position, whereupon a pulse is sent to the stepping coil 80 of $S_3$, thus advancing it to its first position to register 100 counts. At the same time the contacts of $S_2$ are returned to zero through the action of the relay $R_2$ and the switch $T_3$ in precisely the same fashion as described above for $S_1$, $R_1$ and $T_1$. Thus, this counter, by a repetition of these processes, is capable of counting to 999. The entire counter may be cleared by application of an A-pulse to the reset terminal 84. This initiates, through relays $R_1$, $R_2$, $R_3$, a reset process on $S_1$, $S_2$, $S_3$ as described above.

Counting associated with backing to emitter

For operation as required in Fig. 11, the counter of Fig. 19 operates as follows:

A-pulses are applied by way of normally closed contacts of relay $R_4$, to the left step coil 15. They are also applied directly to the counter input pulser 75. When one of the counter switches has reached an appropriate contact, e. g. P–2, B+ voltage is applied through this contact to the coil of $R_4$. The next A-pulse then passes through normally open contacts of $R_4$ to the program advance pulser 30 and to counter reset 84. Thus by selection of the switch contact to which the coil of $R_4$ is connected, the number of steps taken during this stage of the program may be precisely determined. For a transistor whose P-layer width is of the order of 0.2 mil, twenty steps have been found to provide certainty of passage of the gold wire 6 past the P-layer to the emitter end of the bar 1, and to allow for any uncompensated lost motion in the machine, without requiring an undue amount of time for the completion of the following stage "Search II."

Step to right 100 (program step 11)

For the purposes of the count required by Fig. 16, the counter of Fig. 19 operates in precisely the fashion just described except that the coil of relay $R_5$ is connected to stepping switch contacts U–1. Thus one hundred steps are taken followed by advance to the next stage of the program.

Steps to bond (program step 8)

For the purposes of the count required by Fig. 13, the counter of Fig. 19 operates as follows:

Connections are made between the ten contacts of bank L of $S_1$ and the ten contacts of an auxiliary rotary switch 87. The auxiliary switch, whose wiper is connected to the bonding current source 63 in Fig. 13 and to the program advance pulser 30 is manually set on the position corresponding to the desired number of steps to bond, measured from the emitter junction. A-pulses sent to the counter advance $S_1$ until the wiper of the L bank, carrying B+, reaches the contact corresponding to that set on the auxiliary switch 87. B+ is then connected through this contact on $S_1$, through the contact on the auxiliary switch, and initiates a bond pulse. Bonding current then flows through selector contacts H–8, the ocllector terminal of the bar 1, the gold wire probe 6, contacts E–8 and to ground. Thus the setting of the auxiliary switch 87 determines how many steps are taken between passage across the emitter junction and the bonding positions. B+ reaching the wiper of the auxiliary switch is applied also to the program advance pulser 30 which shifts the program to the following stage.

Measure P–layer width (program step 5)

For the purposes of the count required by Fig. 10, the counter of Fig. 19 operates as follows:

A-pulses are sent to operate switches $S_1$ and $S_2$ as previously described, resistors are connected to the contacts of bank M of switch $S_1$, and other resistors, each of a magnitude ten times as great as one of the first set, are connected to the contacts of bank Q of switch $S_2$.

Figure 20:
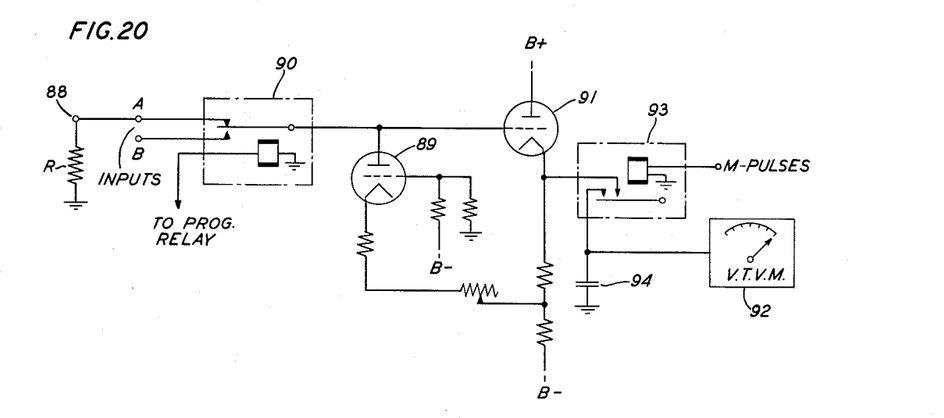
Fig. 20 is a schematic circuit diagram showing a resistance-measuring circuit.

The various measurements described above may all advantageously be made by passing a constant current of known magnitude through the resistance to be measured, and measuring the resulting voltage which appears across this resistance. A suitable measuring circuit of this character is shown in Fig. 20 and its operation will be described in connection with the determination of any one of the step counts described above. Thus, for example, it has already been explained in connection with Fig. 19 that the sum total of the resistance magnitudes of the resistors of stepping switches $S_1$ and $S_2$, to which the stepping contacts of these switches have advanced in the course of a count, is proportional to the number of such steps, and that, by virtue of the connections of Fig. 19, these resistances are connected in series between the point 88 and ground.

Referring now to Fig. 20, the total value of these resistances is represented at the left by a single resistance R which is to be measured. The measurement is made by the application of a constant current to the point 88 which then flows through the resistance R to ground and develops a proportional voltage across it. The constant current may be derived from any suitable generator such, for example, as a vacuum tube triode 89 connected as shown and may be applied through the contacts of a relay 90 which are closed upon the application of a current to the relay coil. This actuating current may be derived from any appropriate power source and routed through supplementary contacts of the program selector 20.

The proportional voltage appearing across the resistor R is applied to the grid of another triode 91, connected for cathode follower action as shown, and the voltage appearing at the output terminal of this cathode follower is applied to the input terminal of a vacuum tube volt meter 92 by closure of the contacts of a relay 93 at the proper time. The relay contacts may be closed on the application of an M-pulse (Fig. 18) to the coil of the relay 93. In order that the indication on the dial of the vacuum tube volt meter 92 shall hold after the removal of the actuating pulse, a condenser 94 of large capacity, for example, 4 microfarads, may be shunted across the input terminal of the vacuum tube volt meter 92. This condenser is charged by an abrupt surge of current from the cathode follower 91 whose output impedance is very low, to the voltage in question. Because of the well known high input impedance of the conventional vacuum tube volt meter, this condenser charge is maintained without noticeable reduction by leakage for a matter of hours, i. e., long enough for a monitor to record the indication on the dial of the volt meter at his leisure.

Figure 21:
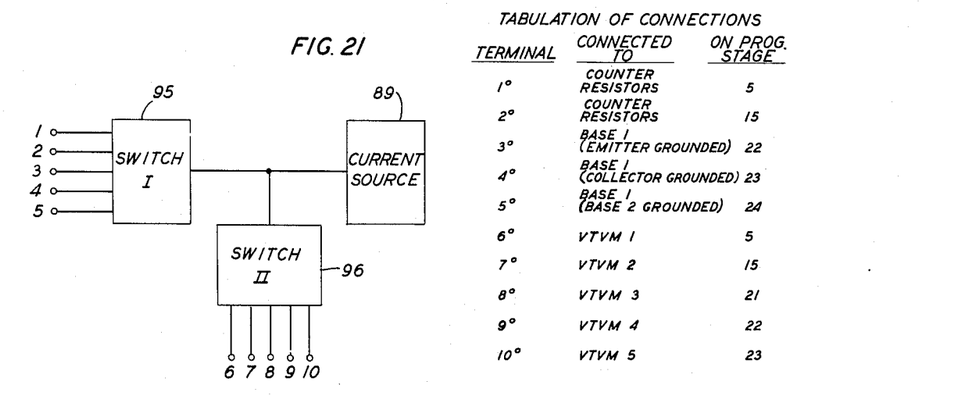
Fig. 21 is a schematic circuit diagram illustrating the application of the circuit of Fig. 20 to other measurements.

All of the other measurements described above may be carried out in the same way, the difference being only that the current of the constant current source 89 is supplied to a different resistance, and that the resulting indication appears on the dial of a different volt meter. This calls for supplementary switching apparatus of the simplest variety which is schematically indicated in Fig. 21, wherein is also shown a tabulation of the connections to be established by the two supplementary switches 95, 96 for each of the measurements. These switches may be actuated in any desired fashion by pulses drawn through other supplementary contacts of the program selector 20.

What is claimed is:

1. Apparatus for fabricating a two-junction transistor from a minute bar of semiconductor material of which the body is of one conductivity type while a narrow intermediate zone, extending transversely of the bar from side to side thereof is of opposite conductivity type, said zone being bounded on one side by an emitter junction and on the other side by a collector junction, which comprises mounting means for said bar, comprising a conductive member fixed to each end thereof, a conductive probe, means for supporting said probe in juxtaposition with said bar, a current source having two terminals, of which one is connected to one of said conductive members and the other is connected to said probe, means for engaging said probe with said bar, near one end of said bar, means for advancing said probe in a direction parallel with the length of said bar toward and past said intermediate zone, means responsive to engagement of the tip of said probe with said emitter junction for initiating a measurement of said advance, means responsive to engagement of the tip of said probe with said collector junction for terminating said measurement, said measurement thereby providing an indication of the width of said zone, means for thereupon advancing said probe in the opposite direction by a distance which exceeds said measured width, means for thereupon advancing said probe in said original direction by a preassigned distance, and means for disconnecting said probing current source from said probe and for connecting a welding current source to said probe, whereby said probe is bonded to said intermediate zone and at an optimum location therein.

2. Apparatus as defined in claim 1 wherein said conductive probe comprises a wire of ductile conductive material having a paddle-shaped tip.

3. Apparatus as defined in claim 2 wherein the long dimension of said paddle-shaped tip extends transversely of the length of said bar.

4. Apparatus as defined in claim 1 wherein said probe-engaging means comprises means for generating a start pulse, means responsive to said start pulse for advancing said probe in a direction normal to the long dimension of said bar and until it makes electrical contact with said bar, and means responsive to the flow of current from said probe to said bar for terminating said advance.

5. Apparatus as defined in claim 1 wherein said probe-advancing means is moved in small discrete steps of like magnitude.

6. In combination with apparatus as defined in claim 5, means for initiating a count of said steps in response to engagement of the tip of said probe with said emitter junction and for terminating said count in response to engagement of the tip of said probe with said collector junction, whereby said step count constitutes a measurement of the width of said intermediate zone.

7. In combination with apparatus as defined in claim 6, means for advancing said probe in said opposite direction by a number of said small steps which exceeds said counted number.

8. Apparatus for determining, for a minute bar of semiconductor material of which the body is of one conductivity type, the location of a thin zone, extending transversely of the bar from side to side thereof, which is of opposite conductivity type, said zone being bounded on one side by an emitter junction and on the other side by a collector junction, which comprises mounting means for said bar, comprising a conductive member fixed to each end thereof, a conductive probe, means for supporting said probe in juxtaposition with said bar, a current source connected to said probe, means for engaging said probe with said bar, near one end of said bar, means for advancing said probe by small steps in a direction parallel with the length of said bar toward and past said intermediate zone, means responsive to engagement of the tip of said probe with said emitter junction for initiating a count of said steps, and means responsive to engagement of the tip of said probe with said collector junction for terminating said step count, said step count thereby providing a measure of the thickness of said zone.

9. Apparatus as defined in claim 8 in which said probe-engaging means initially engages said probe with that end of the bar which is contiguous with the emitter junction.

10. In combination with apparatus as defined in claim 8, means for initially testing the bar for its orientation and, if the result of said test is of one sign proceeding with the advance of said probe but, if the result of said test is of the other sign, reversing the orientation of said bar and proceeding with the advance of said probe.

11. Apparatus as defined in claim 10 wherein said orientation-testing and reversing means comprises means for passing a current from end to end of said bar and through both of said junctions, and means responsive to the polarity of the average of said current for determining the orientation of said bar.

12. In combination with apparatus as defined in claim 8, means operative after each small advance step of said probe for applying to said probe a brief electrical pulse in the forward direction.

13. The method of determining, for a minute bar of semiconductor material of which the body is of one conductivity type, the location of a thin zone of opposite conductivity type extending transversely of the bar from side to side thereof, said zone being bounded on one side by an emitter junction and on the other side by a collector junction, which comprises applying an alternating voltage to the ends of said bar, advancing a probe along the surface of said bar in step-by-step fashion, applying to said probe a base electrode bias of a magnitude and polarity to hold a transistor in its cut off state, and monitoring the current which flows lengthwise of said bar under the joint influence of said applied alternating voltage and said steady bias.

14. In combination with the method of claim 13, the step of briefly applying to said probe, prior to each monitoring operation, a current pulse of sign opposite to that of said bias.

15. The method defined in claim 14 wherein the magnitude of the current pulse exceeds the magnitude of the probe bias.

16. In combination with the method defined in claim 13, means for illuminating said bar during each monitoring operation, thereby to accentuate any difference between the rectifier characteristics of said two junctions.

17. In the art of fabricating a two-junction transistor tetrode from a minute bar of semiconductor material of which the body is of one conductivity type while a thin zone, extending transversely of the bar from side to side thereof, is of opposite conductivity type, said zone being bounded on one side by an emitter junction and on the other side by a collector junction, the method which comprises applying a beam of light to said bar, meanwhile passing an alternating current from end to end of said bar, said junctions acting on said current as opposed rectifiers of unlike characteristics to cause the flow through said bar of an average current of polarity dependent on the orientation of said bar, and thereupon orienting said bar in an attitude such that said average current is of a preassigned reference polarity.

18. In the art of fabricating a two-junction transistor tetrode from a minute bar of semiconductor material of which the body is of one conductivity type while a thin zone, extending transversely of the bar from side to side thereof, is of opposite conductivity type, said zone being bounded on one side by an emitter junction and on the other side by a collector junction, the method which comprises applying a beam of light to said bar, meanwhile passing an alternating current from end to end of said bar, said junctions acting on said current as opposed rectifiers of unlike characteristics to cause the flow through said bar of an average current of polarity dependent on the orientation of said bar, thereupon orienting said bar in an attitude such that said average current is of a preassigned reference polarity, engaging a probe with said bar near one end thereof, and advancing said probe longitudinally of said bar in a preassigned direction to determine the conductivity type of that part of the bar which is instantaneously engaged by said probe.

No references cited.